UNITED STATES PATENT OFFICE.

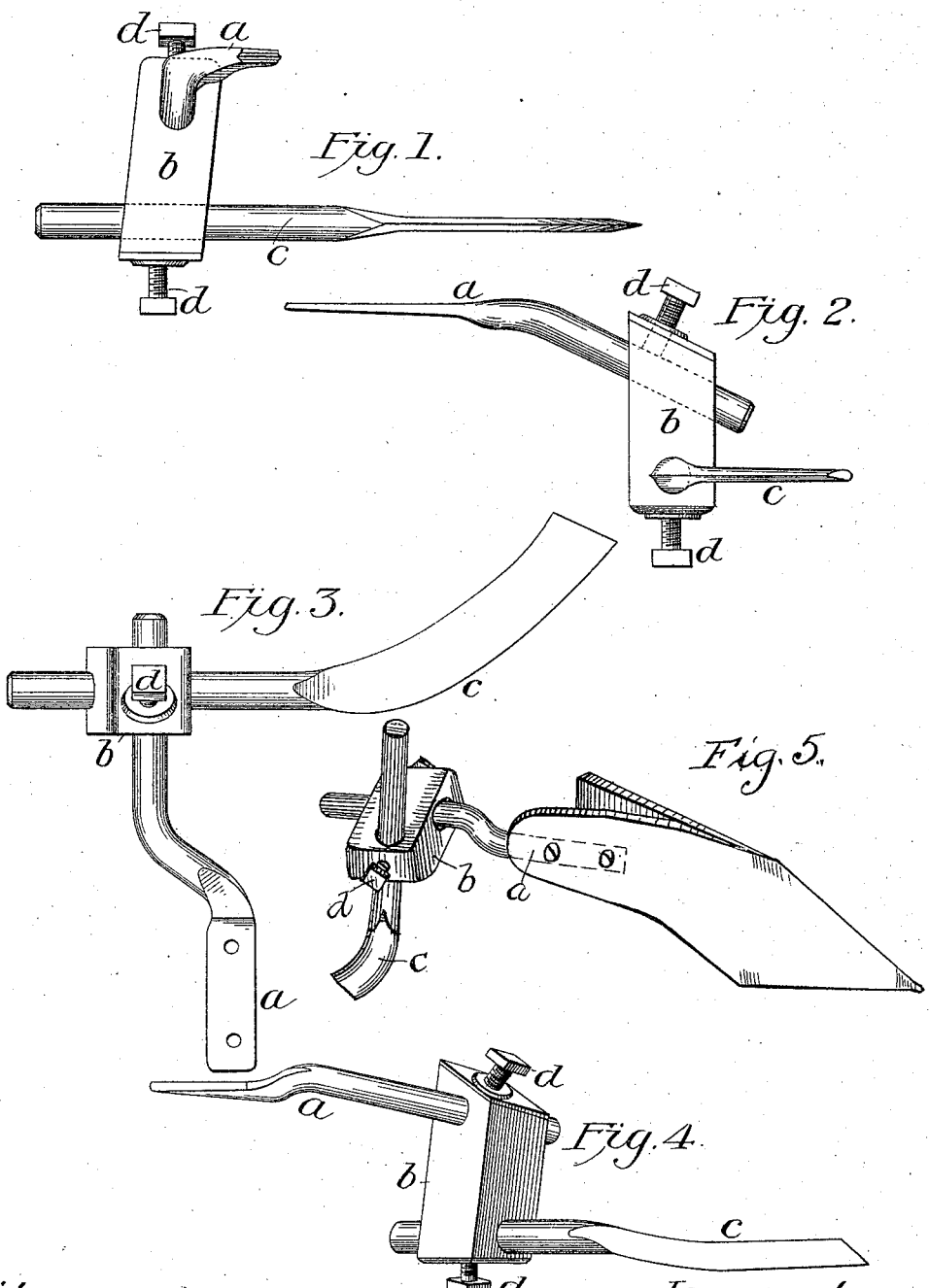

ALFRED WILLIAM LEGG, OF BALCLUTHA, NEW ZEALAND.

FURROW-SPLITTER.

SPECIFICATION forming part of Letters Patent No. 576,864, dated February 9, 1897.

Application filed October 2, 1895. Serial No. 564,470. (No model.)

*To all whom it may concern:*

Be it known that I, ALFRED WILLIAM LEGG, blacksmith, a subject of the Queen of Great Britain, residing in the town of Balclutha, in the British Colony of New Zealand, have invented a new and useful Attachment to a Plow for the Purpose of Splitting Furrows and entitled a Furrow-Splitter, of which the following is a specification.

My invention relates to a method of splitting the furrow directly it is turned and laid by the plow, and comprises an attachment to be secured to the moldboard of an ordinary plow whereby a cutter is held behind the plow in a suitable position for this purpose. I attain this by the mechanism illustrated in the accompanying drawings, in which—

Figure 1 is a view of the invention, looking from the front or from the plow. Fig. 2 is a view looking from underneath. Fig. 3 is a side view of the invention. Fig. 4 is a perspective view of the whole invention. Fig. 5 is a view showing the method of attachment of the furrow-splitter to the moldboard of a plow.

$a$ is the stay attached to the moldboard of any plow by screws or rivets through the holes shown.

$b$ is an adjusting-block provided with set-screws $d$ $d$ and sliding holes for adjusting the cutter $c$ to the required place, so as to split the furrow when the plow is being worked.

$c$ is the cutter bent, as shown, to prevent chocking, and adjusted, as described, for the various depths of cuts. In using, the cutter $c$ splits the furrow when in position, but if not required at any part it can be at once turned up or taken away by means of one or both of the set-screws $d$ $d$. The furrows being so freshly turned are cut in an easy manner by this appliance.

Having now fully described my invention and in what manner the same is to be performed, what I desire to claim and secure by Letters Patent is—

1. In an attachment to the moldboard of a plow, the combination of a stay $a$, and a block $b$, provided with holes and set-screws $d$, $d$, for the purpose of adjustment, with a cutter $c$, the whole for the purpose of splitting furrows all substantially as set forth.

2. The combination with a moldboard, of a plow, of a stay a block having holes carrying set-screws, a cutter adapted to be adjustably connected with said moldboard, whereby the furrow is split directly it is turned by the plow, substantially as and for the purpose set forth.

ALFRED WILLIAM LEGG.

Witnesses:
H. M. DAVEY,
CHAS. E. DAVEY.